United States Patent [19]
Bukin et al.

[11] 3,907,869
[45] Sept. 23, 1975

[54] METHOD OF PRODUCING CALCIUM PANGAMATE

[76] Inventors: Vasily Nikolaevich Bukin, Leninsky prospekt, 13, kv. 74; Irina Nikolaevna Garkina, Michurinsky prospekt, 2, korpus 1, kv. 96, both of Moscow, U.S.S.R.

[22] Filed: Dec. 21, 1971

[21] Appl. No.: 210,588

[52] U.S. Cl............................................ 260/482 R
[51] Int. Cl.²..................................... C07C 101/06
[58] Field of Search...................................... 260/482

[56] References Cited
UNITED STATES PATENTS
2,710,876   6/1955   Krebs et al...................... 260/482 R FOREIGN PATENTS OR APPLICATIONS
37-4765   6/1962   Japan................................ 260/482

OTHER PUBLICATIONS

Szmant, H. H. et al., Organic Chem., p. 242, (1957).

*Primary Examiner*—Anton H. Sutto
*Assistant Examiner*—Paul J. Killos
*Attorney, Agent, or Firm*—Waters, Schwartz & Nissen

[57] ABSTRACT

A method of producing calcium pangamate (vitamin $B_{15}$) consisting in esterification of gluconic acid or the lactone thereof with dimethylglycine hydrochloride in an aqueous medium in the presence of hydrogen chloride or sulfuric acid at a temperature of from 30° to 70°C, the esterification product is concentrated and neutralized with calcium carbonate to obtain almost non-hygroscopic calcium pangamate in a high yield (up to 80 per cent).

2 Claims, No Drawings

METHOD OF PRODUCING CALCIUM PANGAMATE

The present invention relates generally to a method of producing the salt of pangamic acid and, more specifically, to calcium pangamate suitable for use in medical practice as a medicinal preparation possessing a wide activity spectrum.

From a chemical aspect pangamic acid is an ester of gluconic acid and dimethylglycine. The acid and the salts thereof, also referred to as vitamin $B_{15}$, are capable of enhancing oxidative metabolism in cells and tissues and eliminating the phenomena of hypoxia, as well as promoting lipid metabolism and acting as a detoxicant.

According to the abovesaid properties of the preparation it is indicated in various forms of atherosclerosis, including chronic forms of coronary insufficiency, in cerebral arteriosclerosis, pulmonary emphysema, pneumosclerosis accompanied by pulmonary-cardiac insufficiency, chronic hepatitis and incipient stages of liver cirrhosis. The preparation is likewise administrable in certain skin diseases (pruritic dermatoses, etc.), alcoholic intoxication and alcoholism, for better tolerance to corticosteroids, sulfanilamide and other preparations. The preparation has found application also in sports practice as a factor promoting the adaptation of the human organism to intense muscular activity; it is administered once or twice a day in a dose of 0.2 to 0.3 g.

Some methods of producing pangamic acid (vitamin $B_{15}$) are patented but they are too complicated for industrial application and fail to provide a fairly good yield and quality of the specific product. For instance, according to the patent of E. T. Krebs and E. T. Krebs (U.S. Pat. No. 2,710,876, 1955) esterification of gluconic acid and dimethylglycine hydrochloride is carried out by saturating an aqueous solution thereof with gaseous hydrogen chloride and holding at room temperature for 2 weeks, whereupon hydrochloric acid along with admixtures is eliminated from the reaction medium by dialysis through special membranes and the dialisate containing pangamic acid is neutralized by caustic soda and dried lyophilically. The yield of sodium pangamate is ca.25 per cent of the theoretical, the preparation featuring high hygroscopicity.

It is an object of the present invention to provide an industrially suitable method of producing a pharmaceutical preparation, viz., pangamic acid in the form of a nearly non-hygroscopic salt.

According to the invention the reaction of esterification of gluconic acid or the lactone thereof with dimethylglycine hydrochloride is carried out in an aqueous medium in the presence of acid catalysts, viz., gaseous hydrogen chloride or sulfuric acid at a temperature of 30° to 70°C, followed by vacuum-concentration of the esterification product until it becomes syrupy and neutralization thereof with calcium carbonate.

Using gaseous hydrogen chloride used as a catalyst, it is eliminated from the esterification product by distilling off with water, whereupon said product is neutralized with an aqueous suspension of calcium carbonate to a pH value of 6.0–6.5 and precipitated with excess lower aliphatic alcohol, e.g., methanol or ethanol.

When sulfuric acid is employed as a catalyst, the esterification product is neutralized with an aqueous suspension of calcium carbonate to a pH value of 6.0–6.5, calciumsulfate precipitate is filtered off, the filtrate is freed from sulfate ions by adding barium chloride and the resulting solution of calcium pangamate is dried by one of the conventional methods, say, by a spray drier, or is precipitated by one of the above-mentioned alcohols.

In both cases the finished product contains 70–75 per cent of calcium pangamate whose amount is determined from the ester bond through saponification in a non-aqueous medium and under specially selected conditions. Apart from calcium pangamate the preparation contains residual amounts of nonreacted calcium gluconate and dimethylglycine that do not hamper the action of the principal component of the preparation when the latter is used as a remedial agent and are likewise physiologically valuable components of the preparation.

The preparation of the invention is essentially a white or white with a yellowish hue powder, of slightly bitter taste, possessing a slight specific odor, readily soluble in water (1:1), insoluble in alcohol, stable when stored in a tight package (up to 2 years and longer).

The herein-proposed method of producing calcium pangamate is featured by the following advantages:

a. more complete and rapid running of the esterification reaction of dimethylglycine and gluconic acid;

b. higher yield of the specific product;

c. low hygroscopicity good storability of the specific product;

d. carrying out of the process under conditions of conventional pharmaceutical factories and equipment and using available stock materials.

To promote understanding the present invention will now be illustrated by a number of exemplary embodiments thereof.

EXAMPLE 1

98 g of gluconic acid (0.5 mole) and 83.4 g of dimethylglycine hydrochloride (0.6 mole) are dissolved, under slight heating, in 200 ml of water, saturated with gaseous hydrogen chloride and maintained for 3 hours at 40°, whereupon water is distilled off under vacuum (at a residual pressure of 15–20 mm) to a solids content equal to 75–78 per cent (determined by a refractometer), the reaction mass is resaturated with hydrogen chloride and is allowed to remain at the above temperature overnight (i.e., for 15–18 hours).

When kept overnight the reaction mass becomes diluted, water is distilled off once more under vacuum at 50°C to a solids content equal to 81–82 per cent and the mass is allowed to stand for 3 hours. Then the mass is water-diluted by two volumes and hydrogen chloride is eliminated by vacuum-concentration of the solution, the procedure being repeated until a residual content of 2–3 per cent of hydrogen chloride is attained.

The resultant esterification product is neutralized by adding an excess aqueous suspension of calcium carbonate, viz., 50 g per 200 ml of water under constant stirring within a period of up to 3 hours until a stable pH value of 6.0–6.5 is obtained. During that period of time not only neutralization of ester-fixed and free gluconic acid occur but also decomposition of the lactone thereof that has been formed during the esterification process (lactone test).

To clarify the neutralized solution a small amount of activated charcoal is added thereto, whereupon the charcoal is filtered off along with the surplus chalk and the specific product, viz., calcium pangamate is precipitated by adding a surplus amount of methanol or ethanol, filtered off and dried to a residual moisture content not in excess of 5 per cent. The yield of the dry substance is about 110 g or ca. 80 per cent of the theoretical, the content of calcium pangamate being equal to 70–75 per cent.

EXAMPLE 2

98 g of gluconic acid (0.5 mole) and 83.4 g of dimethylglycine hydrochloride (0.6 mole) are dissolved, under slight heating, in 200 ml of water, then 33 ml (60 g) of concentrated sulfuric acid are poured into the solution obtained and the mixture is subjected to constant stirring at 40° for 3 hours; thereupon water is vacuum-distilled off to a solids content of 75–78 per cent, and the reaction mass is allowed to stand at that temperature overnight (for 15–18 hours).

When staying overnight the mass becomes diluted; water is distilled off again under vacuum at 50°C to a solids content of 81–82 per cent and the mass is allowed to stand for 3 hours. The resulting esterification product is neutralized by adding an excess amount of an aqueous suspension of calcium carbonate, viz., 100 g per 400 ml of water under constant stirring during a period of up to 3 hours until a stable pH value of 6.0–6.5 is attained. During that period of time, apart from neutralization, there also occurs decomposition of the lactone that has been formed during esterification (lactone test).

Precipitated calcium sulfate is filtered off and the precipitated is washed. The filtrate and washings are combined, freed from sulfate ions by adding barium chloride and concurrently clarified by activated charcoal and dehydrated in a spray drier. Besides, calcium pangamate may be precipitated as described in Example 1, i.e., by adding an excess amount of lower aliphatic alcohols to the reaction mass having been vacuum-concentrated. The yield of the dry material is nearly 120 g or 85 per cent of the theoretical, the content of calcium pangamate therein being 70–75 per cent.

What is claimed is:

1. A method of producing calcium pangamate, comprising esterifying gluconic acid or the lactone thereof with dimethylglycine hydrochloride in the presence of sulfuric acid in an aqueous medium at a temperature ranging from 30° to 70°C, concentrating the esterification product and neutralizing said product with calcium carbonate.

2. A method as claimed in claim 1, wherein the esterification product is first concentrated and then neutralized with an aqueous suspension of calcium carbonate to a pH = 6.0–6.5, the precipitate of calcium sulfate is filtered off, the filtrate is freed from sulfate ions by adding barium chloride and the thus-obtained calcium pangamate solution is dried.

* * * * *